US012602818B2

(12) United States Patent
Wei et al.

(10) Patent No.: US 12,602,818 B2
(45) Date of Patent: Apr. 14, 2026

(54) CAMERA MONITOR SYSTEM FOR COMMERCIAL VEHICLES INCLUDING WHEEL POSITION ESTIMATION

(71) Applicant: Stoneridge Electronics AB, Solna (SE)

(72) Inventors: Wenpeng Wei, East Lansing, MI (US); Liang Ma, Rochester, MI (US); Yifan Men, Northville, MI (US); Troy Otis Cooprider, White Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 155 days.

(21) Appl. No.: 18/244,549

(22) Filed: Sep. 11, 2023

(65) Prior Publication Data

US 2024/0087159 A1     Mar. 14, 2024

Related U.S. Application Data

(60) Provisional application No. 63/405,912, filed on Sep. 13, 2022.

(51) Int. Cl.
*G06T 7/73*         (2017.01)

(52) U.S. Cl.
CPC ...... *G06T 7/73* (2017.01); *G06T 2207/30241* (2013.01)

(58) Field of Classification Search
None
See application file for complete search history.

(56) References Cited

U.S. PATENT DOCUMENTS

2017/0341583 A1* 11/2017 Zhang .................... H04N 7/181
2020/0031276 A1   1/2020 Noh 2020/0142405 A1*  5/2020 Havens ................ G05D 1/0088
2021/0061353 A1   3/2021 Miller et al.
2023/0415746 A1* 12/2023 Ghandriz .............. B60W 50/06

FOREIGN PATENT DOCUMENTS

WO        2020207572 A1    10/2020
WO        2023121911 A1     6/2023
WO        2023192072 A1    10/2023

OTHER PUBLICATIONS

Caup Lukas et al: "Video-based Trailer Detection and Articulation Estimation", 2013 IEEE Intelligent Vehicles Symposium (IV_, IRRR< Jun. 23, 2013, pp. 1179-1184.
International Search Report and the Written Opinion for International Application No. PCT/US2023/032389 dated Dec. 15, 2023.

* cited by examiner

*Primary Examiner* — James M McPherson

(74) *Attorney, Agent, or Firm* — Carlson, Gaskey & Olds, P.C.

(57) ABSTRACT

A method for estimating a trailer wheel position includes identifying a first set of wheel locations in at least a first image. Each of the wheel locations in the first set of wheel locations is associated with a corresponding trailer angle. A subset of wheel locations is identified in the first set of wheel locations as being false positives and the false positives are removed from the first set of wheel locations. A quadratic regression is applied to the first set of wheel locations and a parabola curve is determined relating a y position in the at least the first image to an x position in the at least the first image. A trailer angle is determined. A current wheel location is estimated by applying the determined trailer angle to the parabola curve.

14 Claims, 6 Drawing Sheets

$$
\begin{bmatrix}
\sum x_i^4 & \sum x_i^3 & \sum x_i^2 \\
\sum x_i^3 & \sum x_i^2 & \sum x_i \\
\sum x_i^2 & \sum x_i & n
\end{bmatrix}
\begin{bmatrix}
a \\
b \\
c
\end{bmatrix}
=
\begin{bmatrix}
\sum x_i^2 y_i \\
\sum x_i y_i \\
\sum y_i
\end{bmatrix}
$$

EQUATION 1

CAMERA MONITOR SYSTEM FOR COMMERCIAL VEHICLES INCLUDING WHEEL POSITION ESTIMATION

TECHNICAL FIELD

This disclosure relates to wheel tracking using a camera monitor system (CMS) of a vehicle, and more specifically to a system and method for tracking a wheel position while the wheel is hidden.

BACKGROUND

Camera monitor systems, such as camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the camera monitor systems cover a larger field of view than a conventional mirror, or include views that are not fully obtainable via a conventional mirror.

Semi-automated driver assist systems, camera monitor systems, electronic stability program systems, and other vehicle systems, use or require knowledge about the location of various vehicle features throughout operation of the vehicle. Among those features can be a real world position or a position in an image of one or more of the rear wheels of the trailer. Systems exist for tracking the position of the wheel while it is visible within the field of view of a rear facing camera using a camera monitor system. However, while the trailer is at a low trailer angle the rear trailer wheels are not be visible in the field of view of either the driver or passenger side cameras and the real world position of the wheels, and the position of the wheels in the image, is unknown. Further, when a view of either the driver or passenger side camera is obstructed or otherwise unavailable, the position of the wheels in the image generated by the obstructed camera cannot be determined using existing systems.

SUMMARY

A method for estimating a trailer wheel position according to an example of this disclosure includes identifying a first set of wheel locations in at least a first image. Each of the wheel locations in the first set of wheel locations is associated with a corresponding trailer angle. A subset of wheel locations is identified in the first set of wheel locations as being false positives and the false positives are removed from the first set of wheel locations. A quadratic regression is applied to the first set of wheel locations and a parabola curve is determined relating a y position in the at least the first image to an x position in the at least the first image. A trailer angle is determined. A current wheel location is estimated by applying the determined trailer angle to the parabola curve.

In a further example of the foregoing, the method includes identifying a second set of wheel locations in at least a second image, each of the wheel locations in the second image being associated with a corresponding trailer angle.

In a further example of any of the foregoing, the method includes identifying a subset of wheel locations in the second set of wheel locations as being false positives and removing the false positives from the first set of wheel locations.

In a further example of any of the foregoing, the first image is one of a class II and a class IV view and the second image is a class II and a class IV view on an opposite side of the vehicle.

In a further example of any of the foregoing, the parabola curve is defined according to $y=ax^2+bx+c$, with 'a' being not equal to zero, y being a position of the wheel in the image on the y-axis and x being a position of the wheel in the image on the x-axis.

In a further example of any of the foregoing, the method includes providing the determined wheel position to at least one additional vehicle system.

In a further example of any of the foregoing, at least one additional vehicle system includes at least one of an advanced driver assistance system, a camera monitor system, and an electronic stability program.

In a further example of any of the foregoing, the current wheel location is a location within the image.

In a further example of any of the foregoing, the current wheel location is a real world three dimensional position of the wheel relative to the vehicle.

In a further example of any of the foregoing, the method includes identifying a wheel trajectory with respect to the tractor in an image space using the parabola curve.

In a further example of any of the foregoing, the method includes identifying a wheel trajectory with respect to the tractor in a real-world space using the parabola curve.

BRIEF DESCRIPTION OF THE DRAWINGS

The disclosure can be further understood by reference to the following detailed description when considered in connection with the accompanying drawings wherein.

Equation 1 illustrates a matrix operation that identifies a quadratic wheel estimation function for estimating a wheel position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
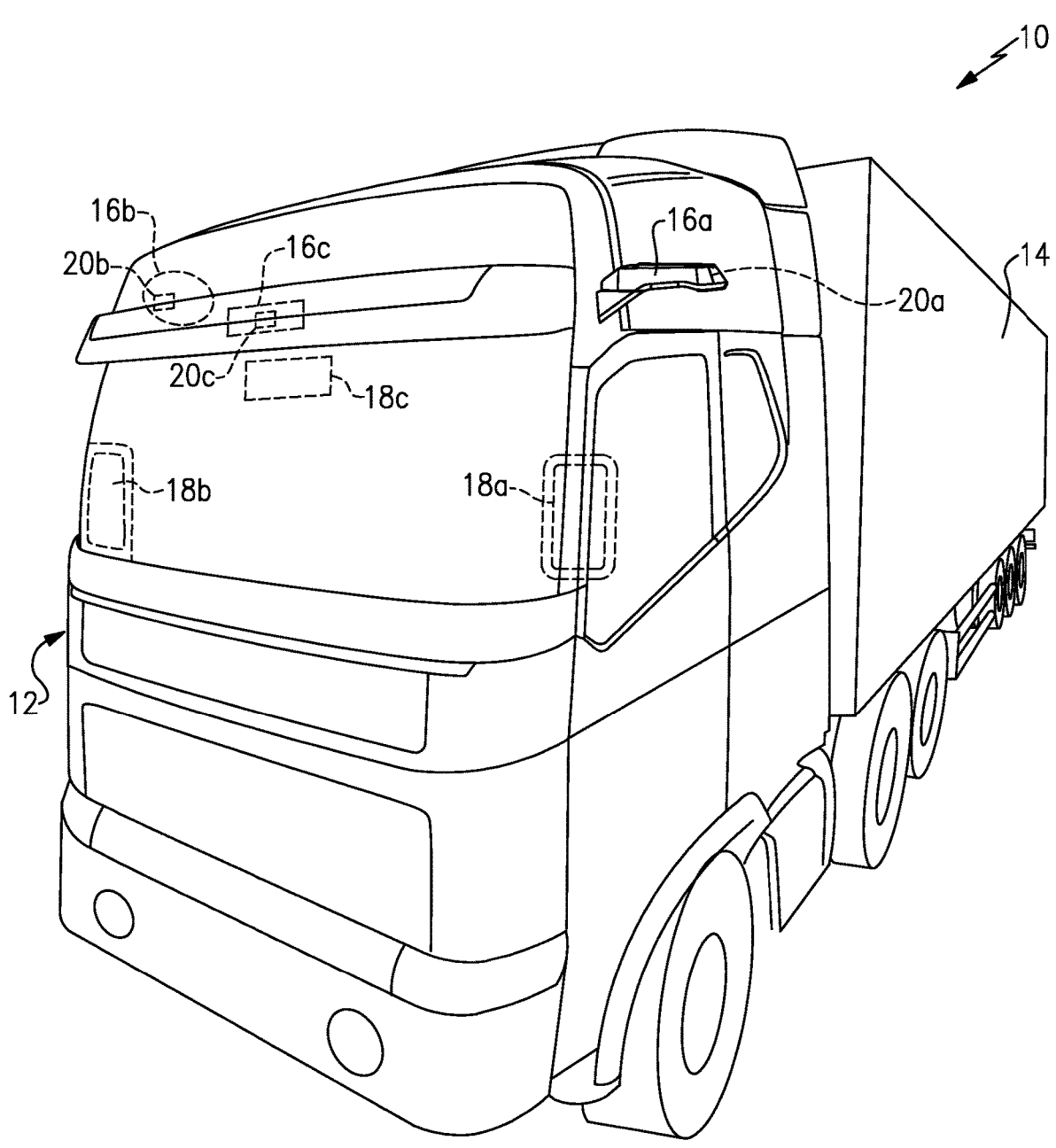
FIG. 1A is a schematic front view of a commercial truck with a camera monitor system (CMS) used to provide at least Class II and Class IV views.
Figure 1B:
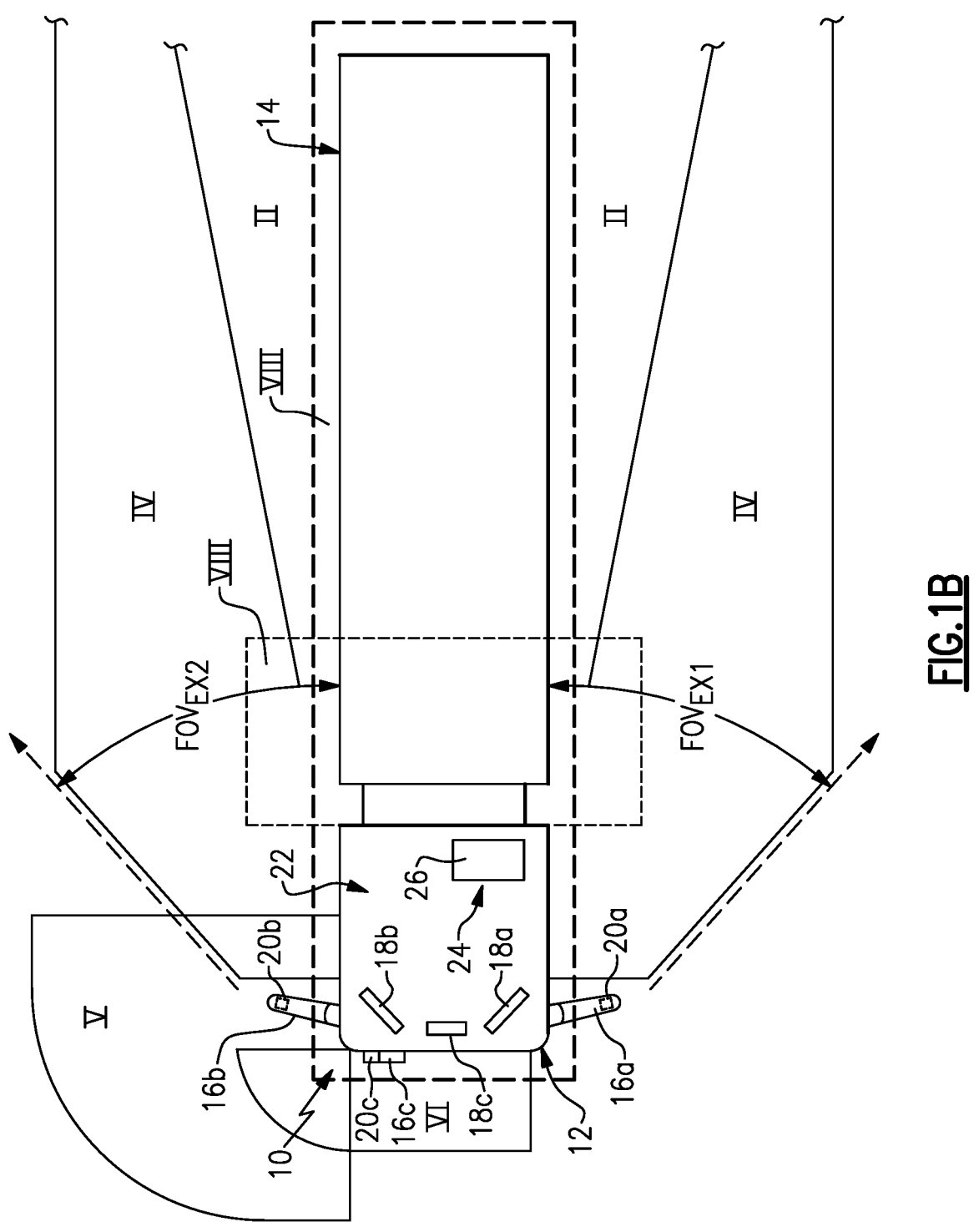
FIG. 1B is a schematic top elevational view of a commercial truck with a camera monitor system providing Class II, Class IV, Class V and Class VI views.
Figure 2:
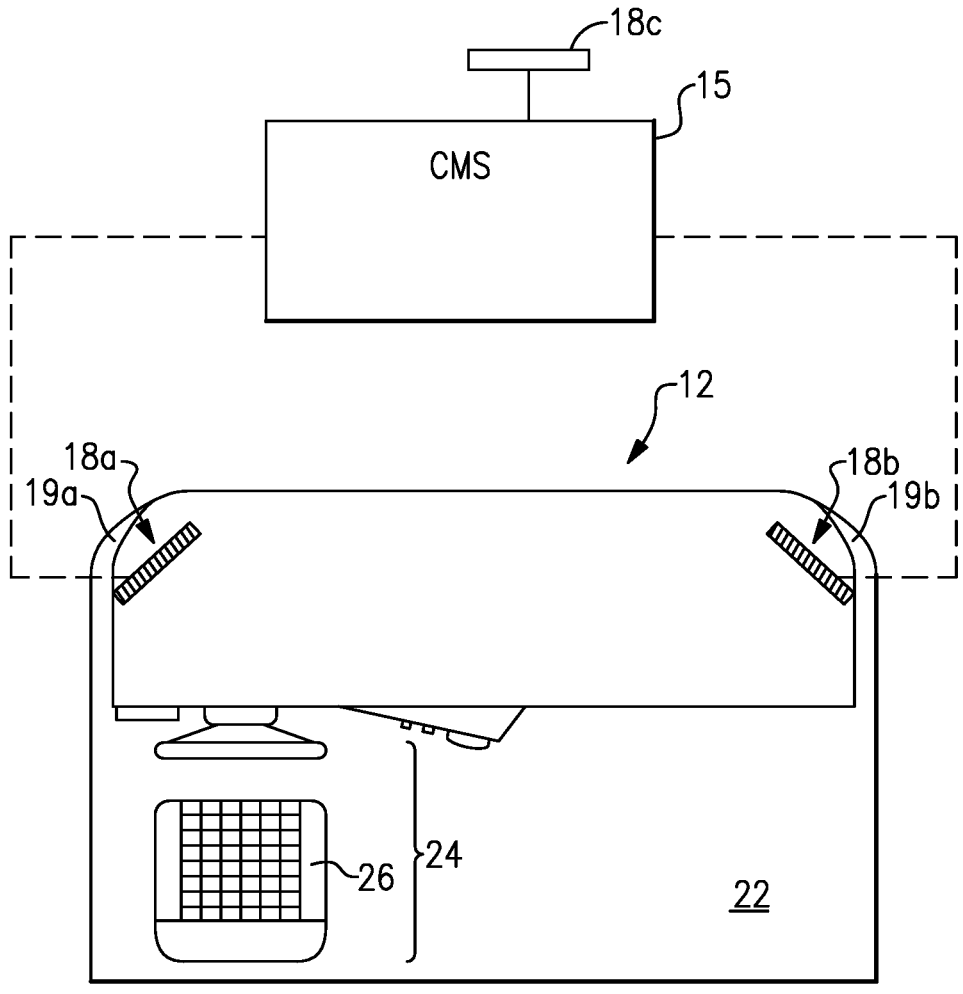
FIG. 2 is a schematic top perspective view of an vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

Figure 3A:
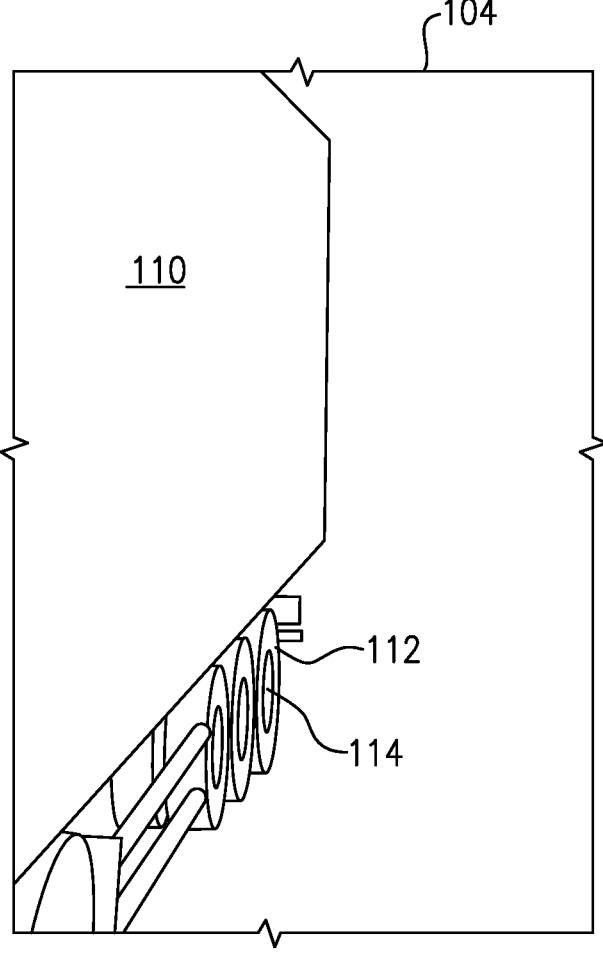
FIG. 3A illustrates a camera monitor system view including a single view of a vehicle trailer at a mid to large trailer angle.
Figure 3B:
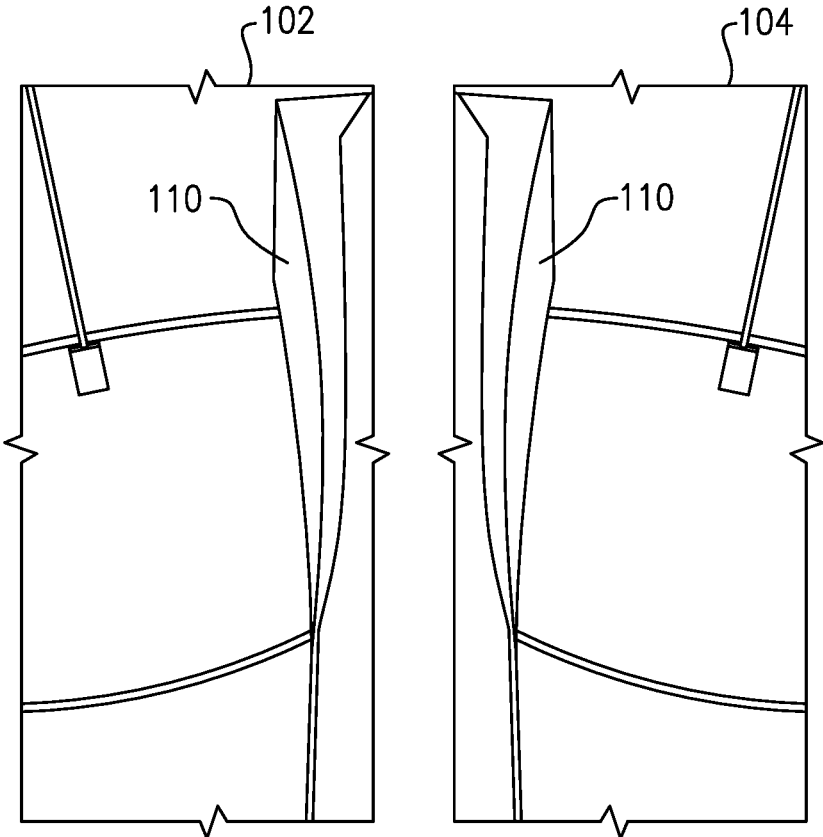
FIG. 3B illustrates a camera monitor system view including two views of a vehicle trailer at a low trailer angle.

With continued reference to FIGS. 1A-2, FIG. 3A schematically illustrates a rear view displayed to a vehicle operator via the CMS described above, while the trailer 110 is at a mid to large (e.g., greater than 10 degree) angle. While at the mid to large trailer angle, the trailer 110 is minimally visible in the opposite view, if it is visible at all, and the opposite view is omitted. FIG. 3B schematically illustrates the trailer 110 in both a driver side display 102 and a passenger side display 104 while the trailer is at a low (e.g., less than 10 degrees) angle. While the trailer 110 is at the mid to large angle, a rearmost wheel 112 is visible in the corresponding view 104. In contrast, when the trailer 110 is at a low trailer angle (FIG. 3B), the wheel 112 is not visible. As it is not visible, the wheel 112 is referred to as hidden. While the exact angle at which the wheel 112 becomes hidden will depend on the position of the camera generating the view, and the length of the trailer 110, the wheel 112 is typically hidden at the low angles (e.g. between 10 and −10 degrees).

In order to facilitate vehicle systems relying on the wheel 112 position, such as advanced driver assistance systems, camera monitor systems, electronic stability programs, and similar vehicle systems, the CMS monitors the views 102, 104 and identifies the wheel position 112 during any operating condition where the wheel 112 is visible. Existing object tracking systems can identify the wheel 112 when it is visible and track the center point 114 of the wheel 112 as it travels through the image. The position in the image can then be translated to a real world 3D position again using known systems. In addition to using these monitored wheel positions, the CMS generates a data set from each image, with each point in each of the data sets identifying a center point 114 of the wheel 112 in the image, and coordinating the center point 114 of the wheel 112 with an angle of the trailer 110 at which the wheel position was detected. The angle of the trailer 110 is detected using one of a trailer angle sensor, CMS image analysis, or a combination of the two.

Based on the relationships established using the wheel 112 detections and trailer angles while the wheel(s) are visible, the CMS 15 is configured to identify a quadratic equation correlating the position of the wheel within the image and the trailer angle. Based on this correlation, the CMS 15 can then identify the estimated wheel position during periods where the wheel 112 is not visible in the image(s). By way of example, this can occur while the wheel(s) 112 are hidden during the low angles shown in FIG. 3B, or while the wheel position is hidden due to obstruction, weather, or other external effects.

The estimated wheel positions are provided to any CMS or other vehicle systems that use the information, thereby providing a continuous wheel position to the CMS or other vehicle systems.

Figure 4:
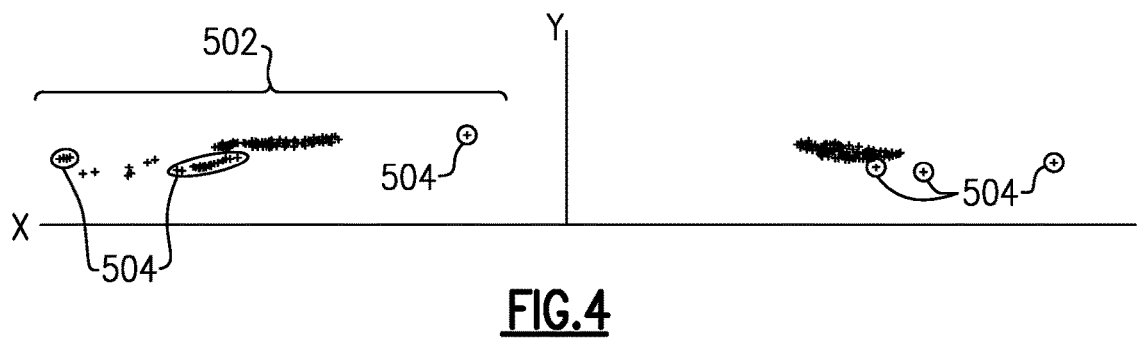
FIG. 4 illustrates a data set of trailer wheel positions within the image(s).
Figure 5:
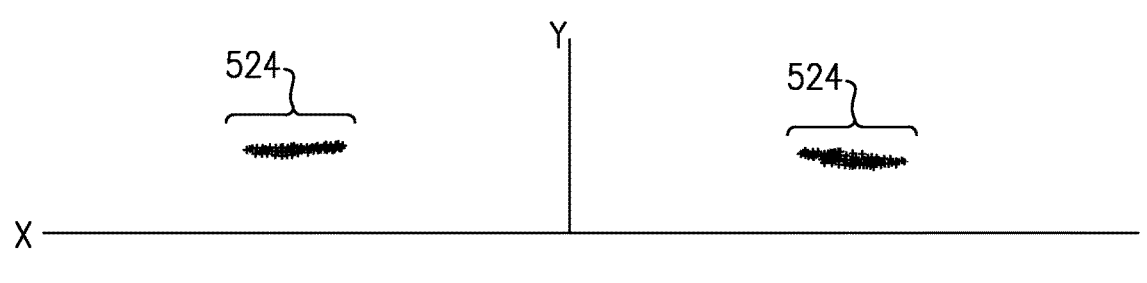
FIG. 5 illustrates the data set of FIG. 4 with false positive detections removed.
Figure 6:
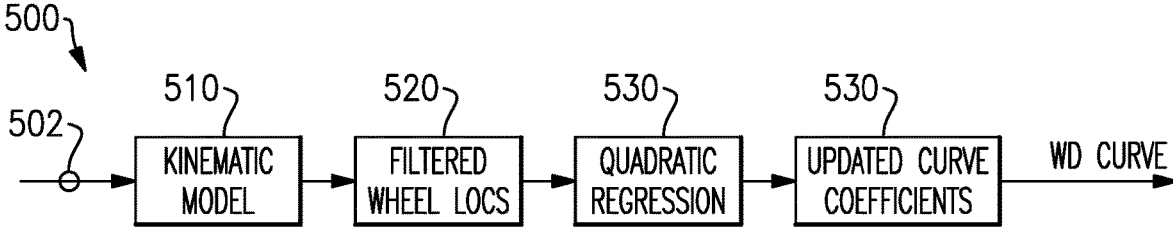
FIG. 6 illustrates a control process for identifying a wheel position estimation.

With continued reference to FIGS. 1-3B, FIGS. 4, 5, and 6 illustrate an on the road process for generating a wheel position estimation specific to a currently attached trailer 110 using the control process 500 illustrated in FIG. 6. Initially, raw wheel locations 502 (illustrated in FIG. 4) are provided to the control system 500. The raw wheel locations 502 are generated using any upstream wheel detection process or algorithm and can include one or more false detections 504. Each of the wheel locations 502, and false detections 504, includes a corresponding trailer angle that is computed based on the wheel location within the image. The trailer angles are computed using any conventional trailer angle computation method including trailer angle sensors, tractor-trailer kinematic models, image based detection, a combination of sensor and image based detection, or any other conventional detection method. As represented in FIGS. 4 and 5, the x and y are image boundaries, and the position of the data point within the x-y plane is the position of the wheel detection within the image.

After receiving the raw wheel positions and trailer angles, a plausibility check is applied to the raw wheel locations 502. The plausibility check uses a kinematic model to determine a ground truth trailer angle and compares the ground truth trailer angle to the received raw wheel position and trailer angle. When the angle determined via the kinematic model differs from the received angle by at least a certain amount, a false positive 504 is detected. False positives 504 correspond to wheel locations that are not possible and/or not probable given the known information inputs (e.g., speed, steering angle, grade, etc.) and the determined information outputs (e.g., trailer angle) from the kinematic model 510. The not possible and/or not probable wheel locations 504 are filtered out from the data sets 502 using a filter 520 resulting in a filtered data set 524, illustrated in FIG. 5.

In one example, the kinematic model 510 uses only tractor forward driving operations to ensure accuracy. While it is appreciated that some accurate wheel detections may inadvertently be filtered out using the kinematic model approach defined herein, as long as no, or minimal, false detections are present the process can operate on less than a full set of accurate wheel detections.

After generating the filtered data set 524, the process 500 applies a quadratic regression 530 to the data set. In one example, the quadratic regression 530 is a matrix reduction according to equation 1, and provides a resultant quadratic formula in the form of $y=a*x^2+b*x+c$, where a is not equal to 0, y is a pixel coordinate of the wheel location. In alternative examples, alternative forms of quadratic regression can be utilized to generate a quadratic equation relating the trailer angle to the position of the wheel within the image. The controller operating the process 500 then receives the updated coefficients from the determined equation, and a new wheel position curve (the resultant quadratic formula) is provided to the CMS 15, as well as to any other vehicle systems that may need to estimate the wheel location.

While the example described above estimates the wheel position within an image, it should be understood that the wheel position can be converted to a 3D world model position either before or after application of the method described herein, and the same process can be utilized to estimate an actual wheel position in addition to estimating a wheel position within the image. The 3D world model position describes a real world three dimension position of the wheel, relative to a defined point on the vehicle.

The estimation system and process described above generates an estimated wheel position with the image generated by the views 102, 104. The CMS controller and/or other vehicle system controllers convert the estimated image position to a corresponding three dimensional real world position and the corresponding three dimensional position can be used as needed.

In at least one example, the estimated wheel position is provided from the CMS controller to a trailer end detection module within the CMS system. The trailer end detection module can be a software module also positioned within the controller or a separate software system in communication with the CMS controller. The trailer end detection module uses the wheel location to assist in identifying the trailer end, and the trailer end position is marked in a CMS display to improve situational awareness of the vehicle operator. In another example, the wheel position may also be used by the CMS to estimate a position of the entire wheelbase and the wheelbase distance can then be used within the CMS.

In another example, the estimated wheel position is provided to an advanced driver assistance system within the vehicle and separate from the CMS system.

The CMS includes at least one processor and at least one non-transitory electronic storage medium that stores instructions which when executed cause the CMS to perform the method steps and calculations described herein.

Although an example embodiment has been disclosed, a worker of ordinary skill in this art would recognize that certain modifications would come within the scope of the claims. For that reason, the following claims should be studied to determine their true scope and content.

What is claimed is:

1. A method for estimating a trailer wheel position of a vehicle with a camera monitor system, comprising:
    identifying a first set of wheel locations of one or more wheels of the vehicle in at least a first image, each of the wheel locations in the first set of wheel locations being associated with a corresponding trailer angle;
    identifying a subset of wheel locations in the first set of wheel locations as being false positives and removing the false positives from the first set of wheel locations;
    applying a quadratic regression to the first set of wheel locations and determining a parabola curve relating a y position in the at least the first image to an x position in the at least the first image;
    determining a trailer angle;
    estimating a current wheel location of the one or more wheels by applying the determined trailer angle to the parabola curve; and
    modifying a displayed image depicted on a display of the vehicle in response to the estimated current wheel location.

2. The method of claim 1, further comprising identifying a second set of wheel locations in at least a second image, each of the wheel locations in the second image being associated with a corresponding trailer angle.

3. The method of claim 2, further comprising identifying a subset of wheel locations in the second set of wheel locations as being false positives and removing the false positives from the second set of wheel locations.

4. The method of claim 2, wherein the first image is one of a class II and a class IV view and the second image is a class II and a class IV view on an opposite side of the vehicle.

5. The method of claim 1, wherein the parabola curve is defined according to $y=ax^2+bx+c$, with 'a' being not equal to zero, y being a position of a wheel of the one or more wheels in the first image on the y-axis and x being a position of the wheel in the first image on the x-axis.

6. The method of claim 1, further comprising providing the estimated current wheel location to at least one additional vehicle system.

7. The method of claim 6, wherein the at least one additional vehicle system includes at least one of an advanced driver assistance system, a camera monitor system, and an electronic stability program.

8. The method of claim 1, wherein the current wheel location is a location within the first image.

9. The method of claim 1, wherein the current wheel location is a real world three dimensional position of a wheel of the one or more wheels relative to the vehicle.

10. The method of claim 1, wherein the vehicle includes a tractor and a trailer pulled by the tractor.

11. The method of claim 10, further comprising identifying a wheel trajectory with respect to the tractor in an image space using the parabola curve.

12. The method of claim 10, further comprising identifying a wheel trajectory with respect to the tractor in a real-world space using the parabola curve.

13. The method of claim 6, wherein the at least one additional vehicle system includes a trailer end detection module that uses the estimated current wheel location to identify an end of the trailer.

14. The method of claim 13, wherein the end of the trailer is marked in a display viewable by an operator of the vehicle.

\*   \*   \*   \*   \*